United States Patent
Kim

(10) Patent No.: US 8,005,044 B2
(45) Date of Patent: Aug. 23, 2011

(54) APPARATUS AND METHOD FOR TRANSMITTING SERVICE GUIDE IN BROADBAND WIRELESS ACCESS SYSTEM

(75) Inventor: Ki-Back Kim, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 883 days.

(21) Appl. No.: 12/018,655

(22) Filed: Jan. 23, 2008

(65) Prior Publication Data

US 2008/0175237 A1    Jul. 24, 2008

(30) Foreign Application Priority Data

Jan. 23, 2007 (KR) .......... 10-2007-0007213
Feb. 16, 2007 (KR) .......... 10-2007-0016757
Mar. 2, 2007 (KR) .......... 10-2007-0021060
Aug. 16, 2007 (KR) .......... 10-2007-0082423

(51) Int. Cl.
    *H04Q 7/00* (2006.01)
    *H04L 12/28* (2006.01)
(52) U.S. Cl. ........ 370/329; 370/315; 370/389; 455/3.02
(58) Field of Classification Search .......... 370/310–402; 455/3.02–566; 725/25–449; 709/200–232
See application file for complete search history.

(56) References Cited

U.S. PATENT DOCUMENTS

| 7,672,280 | B2 * | 3/2010 | Shim et al. ............ 370/338 |
| 2005/0013268 | A1 * | 1/2005 | Chang et al. ............ 370/328 |
| 2006/0126556 | A1 | 6/2006 | Jiang et al. |
| 2009/0046637 | A1 | 2/2009 | Kim et al. |

FOREIGN PATENT DOCUMENTS

| EP | 1 718 097 | 11/2006 |
| JP | 2004-023675 | 1/2004 |
| KR | 1020060091132 | 8/2006 |
| WO | WO 2004/100402 | 11/2004 |
| WO | WO 2005/018268 | 2/2005 |

OTHER PUBLICATIONS

Jae Yeon Song et al., "Message Sequence Chart of SG Generation and Delivery", Open Mobile Alliance, Online, Mar. 2, 2005.
Topi Pohjolainen et al., "Introducing Method to Determine Well-Defined Subset of SG", Open Mobile Alliance, Online, Sep. 12, 2005.
Jun Wang et al., "Broadcast and Multicast Services in CDMA2000", IEEE Communications Magazine, vol. 42, No. 2, Feb. 1, 2004.

* cited by examiner

Primary Examiner — Afsar M. Qureshi
(74) Attorney, Agent, or Firm — The Farrell Law Firm, P.C.

(57) ABSTRACT

A method and apparatus for receiving a service guide for a user terminal in a broadband wireless access system. The method includes transmitting, by the user terminal, a service guide request message to a MultiCast and BroadCast Service (MCBCS) server, and receiving, from the MCBCS server, a service guide response message including a mapping table. The mapping table identifies application layer name tags versus Medium Access Control (MAC) layer name tags with respect to broadcast channels, each of the MAC layer name tags being a Multicast Connection IDentifier (MCID) and each of the application layer name tags being a broadcast channel Internet Protocol (IP).

20 Claims, 7 Drawing Sheets

| CHANNEL ID | ZONE ID | BROADCAST CHANNEL IP ADDRESS | MULTICAST CID |
|---|---|---|---|
| 1 (KBS) | 1,2,3 | 233.15.220.9 (E9,DC,0000 1001) | 0xFEA1,0xFEA2,0xFEA3 |
| 11 (MBC) | 1,2,3 | 233.15.220.10 (E9,F,DC,0000 1010) | 0xFEA4,0xFEA5,0xFEA6 |
| 111 | 1,2,3 | 233.15.220.11 (E9,F,DC,0000 1011) | 0xFEA7,0xFEA8,0xFEA9 |
| ... | | | ... |
| 2 | 1,2,3 | 233.15.220.13 (E9,F,DC,0000 1101) | 0xFEB1,0xFEB2,0xFEB3 |
| 21 | 1,2,3 | 233.15.220.14 (E9,F,DC,0000 1110) | 0xFEB4,0xFEB5,0xFEB6 |
| 211 | 1,2,3 | 233.15.220.15 (E9,F,DC,0000 1111) | 0xFEB7,0xFEB8,0xFEB9 |
| ... | | | ... |
| 3 | 1,2,3 | 233.15.220.18 (E9,F,DC,0001 0010) | 0xFEC1,0xFEC2,0xFEC3 |
| 31 | 1,2,3 | 233.15.220.20 (E9,F,DC,0001 0100) | 0xFEC4,0xFEC5,0xFEC6 |
| 311 | 1,2,3 | 233.15.220.19 (E9,F,DC,0001 0011) | 0xFEC7,0xFEC8,0xFEC9 |
| ... | | | ... |

FIG.7

APPARATUS AND METHOD FOR TRANSMITTING SERVICE GUIDE IN BROADBAND WIRELESS ACCESS SYSTEM

PRIORITY

This application claims priority under 35 U.S.C. §119(a) to an application filed in the Korean Intellectual Property Office on Jan. 23, 2007 and assigned Serial No. 2007-7213, an application filed in the Korean Intellectual Property Office on Feb. 16, 2007 and assigned Serial No. 2007-16757, an application filed in the Korean Intellectual Property Office on Mar. 2, 2007 and assigned Serial No. 2007-21060, and an application filed in the Korean Intellectual Property Office on Aug. 16, 2007 and assigned Serial No. 2007-82423, the contents of which are incorporated herein by reference.

BACKGROUND OF THE INVENTION

1. Field of the Invention

The present invention relates generally to a Broadband Wireless Access (BWA) system, and, in particular, to an apparatus and method for transmitting a service guide in a BWA system, the service guide including a mapping table of application layer name tags versus Internet Protocol (IP) layer name tags or Medium Access Control (MAC) layer name tags with respect to broadcast channels, a table of broadcasting information, authentication information, an actual broadcast channel name mapped to an application layer name tag, and a combination thereof.

2. Description of the Related Art

As generally known in the art, communication systems have been primarily developed for voice communication services, but they are also evolving to provide data services and various multimedia services. However, conventional communication systems, which are mainly directed to providing voice communication services, still have a narrow data transmission bandwidth and require a high subscription fee. For these reasons, they cannot satisfy diversified user demands. Furthermore, in line with rapid development in the communication industry and ever-increasing demands on Internet services, it is important to provide communication systems capable of providing Internet services efficiently. As a result of these trends, BWA systems having a bandwidth large enough to both satisfy the increasing user demands and provide efficient Internet services have been proposed.

In addition to providing voice communication services, BWA systems aim at supporting a variety of low-speed and high-speed data services and multimedia application services (e.g., high-quality moving pictures) in combination. Based on wireless media using a broadband of 2 GHz, 5 GHz, 26 GHz, or 60 GHz, BWA systems are able to access a Public Switched Telephone Network (PSTN), Public Switched Data Network (PSDN), Internet network, International Mobile Telecommunications-2000 (IMT-2000) network, and Asynchronous Transfer Mode (ATM) network in a mobile or stationary environment. In other words, BWA systems can support a channel transmission rate of at least 2 Mbps. BWA systems may be classified into broadband wireless local loops, broadband mobile access networks, and high-speed wireless Local Area Networks (LANs) according to the terminal's mobility (stationary or mobile), communication environment (indoor or outdoor), and channel transmission rate.

The standardization of wireless access schemes of BWA systems such as WiMAX is being conducted by Institute of Electrical and Electronics Engineers (IEEE), which is one of the international standardization organizations, particularly by the IEEE 802.16 standardization group. Compared to conventional wireless communication systems for voice communication services, IEEE 802.16 communication systems have a larger data transmission bandwidth. Therefore, they can transmit more data for a limited period of time and share all user channels (or resources) for efficient channel utilization. Also, since Quality of Service (QoS) features are guaranteed, users can be provided with various services of different qualities, depending on the service characteristics.

The IEEE 802.16 system supports the standard of a MultiCast and BroadCast Service (referred to as MCBCS or MBS depending on the intentions of operators or standardization groups). In the MCBCS standard, an MBS (Multicast and Broadcast Service) zone is a zone including one or more subcells that transmit the same broadcast channel at the same frequency at the same time. The subcells in the MBS zone use the same Connection IDentifier (CID) for the same broadcast channel or content. Herein, the subcell is a group having one frequency and one sector. In general, a Multicast CID (MC-IDs) has a 1:1 mapping relationship with a broadcast channel that has a broadcast channel IP, and a Logical Channel ID (LCID) has a 1:1 mapping relationship with a content ID that is used to discern between broadcast contents included in the payload of the same broadcast channel IP. A base station (BS) transmits an MBS zone ID list through a Downlink Channel Descriptor (DCD) message to broadcast information about whether it can support an MCBCS service and information about whether it belongs to an MBS zone. The MBS zone may include one or more base stations.

In the MCBCS service, unlike a conventional unicast service, a plurality of base stations transmit the same broadcast contents at the same frequency at the same time and a receiving (RX) terminal combines packets received from the base stations, thereby increasing the RX performance. For the conventional unicast service, when a user terminal is located at a cell edge, transmission/reception of data is not smooth due to a large inter-cell interference. However, for the MCBCS service, because neighbor BSs transmit the same contents at the synchronized time, the user terminal can receive and combine the same data from a plurality of base stations even when a user terminal is located at a cell edge. This is called a macro diversity gain.

The MCBCS-related standard defined in the IEEE 802.16e has the following limitations. The standard does not provide a broadcast message indicating to which MCID each broadcast channel IP is mapped. Therefore, each user terminal needs to generate a unicast flow at every process of handoff, broadcast channel request (selection), deletion or change and accordingly the user terminal must maintain an awake state. Thus, a restriction is imposed on the maximum number of awake-state user terminals per sector. This promises that a unicast flow occurs frequently even for a user terminal receiving only a broadcast service. Therefore, the system must allocate a Channel Quality Information CHannel (CQICH) for such a case. Herein, the MCID is a factor that is used at a MAC layer to discriminate between broadcast channel data bursts and discriminate between MBS_DATA_IEs in an MBS-MAP message.

Also, when a handoff condition occurs in the awake or sleep state, even a user terminal receiving only a broadcast service performs a handoff process, which leads to a waste of air resources and system processing capacity. Herein, the broadcast reception may be interrupted when the handoff fails.

Also, air resources are wasted due to performance of a broadcast channel process operation on each user terminal. When each user terminal performs the request/change/deletion process for all the broadcast channels, a MAP overhead increases and also a data burst of a signaling MAC message is wasted.

Also, there is an increased delay due to each broadcast channel process operation. That is, a delay increases because a user terminal performs each broadcast channel process operation through a Base Station (BS), an ASN-GW, an MCBCS server, and a policy server. In particular, the user terminal is susceptible to a channel change time, and a channel change causes a large transmission latency of several hundreds of ms (milliseconds) because it requires both of the deletion and request processes.

Also, when each user terminal performs the broadcast channel request/deletion/change process, an uplink subframe is essentially needed, power is wasted due to uplink transmission, and a macro diversity scheme is further complicated.

Also, a performance degradation, an increased signaling overhead, and many abnormal cases are generated when entities for allocation of MBS zones, MCIDs or LCIDs, generation/transmission of broadcast tables of Service Providers (SPs), and generation/management of MBS-MAP messages, which are important, are determined unsuitably.

SUMMARY OF THE INVENTION

An object of the present invention is to substantially solve at least the above problems and/or disadvantages and to provide at least the advantages below. Accordingly, an object of the present invention is to provide an apparatus and method for transmitting a service guide in a BWA system.

Another object of the present invention is to provide an apparatus and method for transmitting a service guide in a BWA system, the service guide including a mapping table of application layer name tags versus IP layer name tags or MAC layer name tags with respect to broadcast channels, a table of broadcasting information, authentication information, an actual broadcast channel name mapped to an application layer name tag, and a combination thereof.

Still another object of the present invention is to provide an apparatus and method for transmitting a service guide in a BWA system, which can eliminate a variety of factors necessitating the maintenance of an awake state of a user terminal, thereby preventing a waste of power, which may be caused by periodic uplink transmission due to the awake state of the user terminal, and a waste of air resource necessary for a signaling process.

Another object of the present invention is to provide an apparatus and method for transmitting a service guide in a BWA system through a multicast broadcast flow, a broadcast flow, or a unicast flow.

Yet another object of the present invention is to provide an apparatus and method for generating/managing an MBS-MAP message in a BWA system.

In accordance with an aspect of the present invention, a method for receiving a service guide for a user terminal in a broadband wireless access system includes transmitting, by the user terminal, a service guide request message to a MultiCast and BroadCast Service (MCBCS) server, and receiving, from the MCBCS server, a service guide response message including a mapping table. The mapping table identifies application layer name tags versus Medium Access Control (MAC) layer name tags with respect to broadcast channels, each of the MAC layer name tags being a Multicast Connection Mentifier (MCID) and each of the application layer name tags being a broadcast channel Internet Protocol (IP).

In accordance with another aspect of the present invention, a method for receiving a service guide for a user terminal in a broadband wireless access system includes transmitting, by the user terminal, a service guide request message to a Service Provider (SP), and receiving from a MultiCast and BroadCast Service (MCBCS) server, a service guide response message including a mapping table. The mapping table identifies application layer name tags versus Medium Access Control (MAC) layer name tags with respect to broadcast channels, each of the MAC layer name tags being a Multicast Connection IDentifier (MCID) and each of the application layer name tags being a broadcast channel Internet Protocol (IP).

In accordance with another aspect of the present invention, an apparatus for receiving a service guide for a user terminal in a broadband wireless access system includes an application layer unit for transmitting a Medium Access Control (MAC) layer name tag corresponding, to a broadcast channel and receiving data corresponding to the broadcast channel; and a MAC layer unit for receiving the MAC layer name tag from the application layer units commanding a PHYsical (PHY) layer unit to receive a flow corresponding to the MAC layer name tag, receiving the flow from the PHY layer unit, and transmitting the data corresponding to the flow to the application layer unit.

BRIEF DESCRIPTION OF THE DRAWINGS

The above and other objects, features and advantages of the present invention will become more apparent from the following detailed description when taken in conjunction with the accompanying drawings in which:

FIG. 7 illustrates an example of a mapping table in a BWA system according to the present invention.

DETAILED DESCRIPTION OF THE PREFERRED EMBODIMENTS

Figure 1:
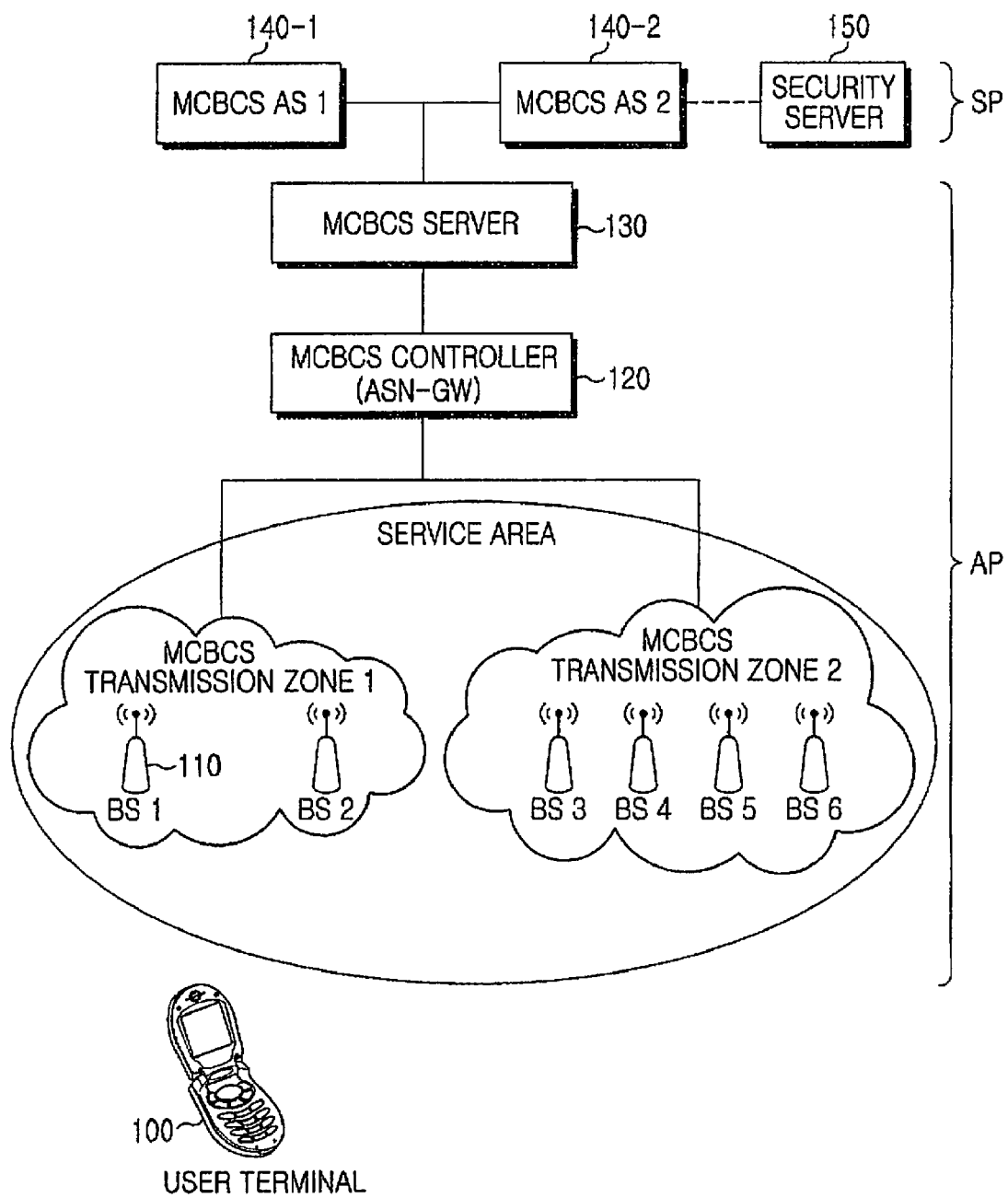
FIG. 1 illustrates a network structure for providing an MCBCS service in a BWA system according to the present invention.

Preferred embodiments of the present invention will be described herein below with reference to the accompanying drawings. In the following description, well-known functions or constructions are not described in detail since they would obscure the invention in unnecessary detail.

The present invention provides four types of service guide transmission methods.

The first service guide transmission method uses a multicast broadcast flow. A user terminal transmits a service guide transmission request message to an MCBCS server through an application layer. Then, the MCBCS server generates a service guide firsthand and transmits the generated service guide to an ASN-GW. Alternatively, the MCBCS server transmits information for generation of a service guide to an ASN-GW so that the ASN-GW generates the service guide firsthand. Thereafter, the generated service guide is transmitted to a base station so that the base station transmits the service guide to the user terminal through a data burst of a specific MCID.

The second service guide transmission method uses a unicast flow. A user terminal transmits a service guide transmission request message to an MCBCS server through an application layer. Then, the MCBCS server searches a data base to extract a service guide and transmits the extracted service guide to the user terminal through an application layer (e.g., HTTP (Hypertext Transfer Protocol)). Herein, the MCBCS server may perform an MCBCS authentication process with a policy server at the above request. In this case, the MCBCS server transmits authentication information to the user terminal, together with the service guide. Herein, the user terminal may transmit the service guide transmission request message to a Service Provider (SP) instead of the MCBCS server. In this case, the service provider triggers the MCBCS server to transmit the service guide to the user terminal.

The third service guide transmission method uses a broadcast flow. A user terminal transmits a service guide transmission request message to an MCBCS server through an application layer. Then, the MCBCS server triggers a base station to generate a broadcast message (e.g., a DCD message) including a service guide to the user terminal.

The fourth service guide transmission method uses a Dynamic Service Addition (DSA) process. A user terminal transmits a service guide transmission request message to an MCBCS server through an application layer. Then, the MCBCS server transmits a DSA request trigger message for triggering transmission of a service guide to an ASN-GW. Then, the ASN-GW transmits the DSA request trigger message to a base station. According to the triggering of the ASN-GW, the base station generates a DSA request message including a service guide and transmits the generated DSA request message to the user terminal.

Herein, the service guide includes a mapping table of application layer name tags versus IP layer name tags or MAC layer name tags with respect to broadcast channels, a table of broadcasting information (broadcast scheduling, transmission rate), authentication information (random seed values for an MCBCS Key Encryption Key (KEK), an MCBCS root key and an MCBCS General Traffic Encryption Key (GTEK) for encryption/decryption of contents or channels; and lifetime values for the MCBCS KEK, the MCBCS root key and the MCBCS GTEK), an actual broadcast channel name mapped to an application layer name tag, and a combination thereof. Herein, each service guide may be constructed in units of each broadcast station or SP, or in units of aggregated base stations or SPs.

Herein, the MAC layer name tag includes an MCID and an LCID, the IP layer name tag includes a broadcast channel IP and a content IP, and the application layer (i.e., an L3 or higher layer) name tag includes a content ID, a broadcast channel ID, a broadcast station ID, and an SP ID. The application layer name tag may include the IP layer name tag. That is, for the MAC layer (e.g., an L7 layer), the application layer may be one of L3 (IP), L4 (Transport), L5 (Application), L6, L7, and a combination thereof (e.g., L3 & L5). In the following description, a mapping table of MCIDs versus broadcast channel IPs is an example of a mapping table of MAC layer name tags versus application layer name tags. It will be apparent that a combination of various mapping tables such as a mapping table of IP layer name tags versus application layer name tags is also possible.

Herein, a method for transmitting the SP list to the user terminal through an air channel is defined in the IEEE 802.16g, which is used in the present invention. That is, the SP list is transmitted to the user terminal through a broadcast message such as an SII-ADV (Service Identity Information-ADVertisement) message and an SBC-RSP (SS Basic Capability-ReSPonse) message transmitted at an initial connection stage. In the present invention, it is assumed that a user terminal already knows the address of an MCBCS server or a Service Provider (SP). In general, the user terminal can obtain the above address via the following methods. In the first method, the above address is stored in the user terminal for configuration. In the second method, the above address is input and set by the user. In the third method, the above address is transmitted simultaneously with the transmission of an SP list at the initial connection stage. In the fourth method, the above address is obtained by connection with a server capable of obtaining the above address. For the fourth method, a client program located in the application layer of the user terminal and a specific server managed by the service provider must support the above function.

In the present invention, the MCBCS server is not only the final entity that transmits broadcast contents to a wireless network through a multicast flow, but also the entity that transmits some or all of the service guide to the user terminal through the wireless network. The broadcast table and the authentication information may be transmitted by the SP to the user terminal. In other words, the MCBCS server transmits not only a broadcast bearer traffic, but also signaling information, by managing the wireless network firsthand on the standpoint of an Access Provider (AP). When several SPs share one wireless network, all the SPs finally provide a user-desired broadcast service through the MCBCS server by using the wireless network.

In the following description, the name of a Network Entity (NE) is defined according to its function and may vary depending on the intentions of the operators or the standardization groups. For example, a Base Station (BS) may also be referred to as a Radio Access Station (RAS). In addition, an Access Service Network-Gateway (ASN-GW) may also be referred to as an Access Control Router (ACR).

In general, the entities related to the MCBCS service include a Content Provider (CP), a Service Provider (SP), and an Access Provider (AP).

The CP creates and provides contents for the MCBCS service. The SP receives the contents from the CP and services the received contents to free users or paid users. The AP transmits the service of the SP to user terminals. The CP, the SP, and the AP may be independent providers. Alternatively, one of the providers may perform all or two of the functions of the providers, an example of which is a terrestrial broadcast service provider in Korea.

FIG. 1 illustrates a network structure for providing an MCBCS service in a BWA system according to the present invention. Referring to FIG. 1, the network structure includes a security server 150, a first MCBCS Application Server (AS) 140-1, a second MCBCS AS 140-2, an MCBCS server 130, an MCBCS controller 120, a Base Station (BS) 110, and a user terminal 100. Herein, the MCBCS controller 120 may be independent of or included in an ASN-GW.

The security server 150 belongs to an area of a Service Provider (SP), and performs the function of authentication, authorization and accounting for MCBCS subscription of users.

The MCBCS AS 140-1/140-2 belongs to the SP area, and performs subscription/management of users for the MCBCS service, transmission of MCBCS contents to an Access Provider (AP), user authentication for access control of illegal users, protection of contents received from a Content Provider (CP), management of user terminals, and provision of information for the MCBCS service. Whereas the MCBCS AS 140-1 is an MCBCS AS for an SP that provides a free service without providing an illegal user control function and a content protection function, the BCBCS AS 140-2 is an MCBCS AS for an SP that provides a paid service while providing an illegal user control function and a content protection function. The detailed functions of the MCBCS AS 140-1/140-2 are as follows.

Generate MCBCS information such as a service guide: Generate the service guide in accordance with a data model agreed between the MCBCS ASs.

Perform a subscription process for MCBCS reception.

Perform authentication, authorization and accounting in connection with the security server 150.

Manage user groups according to MCBCS channels or MCBCS contents.

Manage/distribute group authentication keys.

Illegal user access control/Multimedia content protection (Service Protection/Content protection): manage and distribute content encryption/decryption keys.

Stream transmission/File transmission: Define a transmission protocol; manage a reception report for detecting whether a user has normally received MCBCS contents; and manage file metadata for file transmission.

User interaction: Provide a user interaction service.

Notification/Alert: When a broadcast schedule has changed or an urgent broadcast is needed, provide a service for reporting the case to users that have subscribed to the MCBCS service.

The MCBCS server 130 is an entity that plays a central role in the AP. The MCBCS server 130 performs compilation/transmission of MCBCS information (e.g., a service guide) from a plurality of SPs; management for efficient use of network resources; and support for errorless reception of data by user terminals. The detailed functions of the MCBCS server 130 are as follows.

Manage MCBCS transmission zones: Manage BSs of a service zone according to each SP.

Process a service guide: Aggregate service guides received from the MCBCS ASs; fragment the service guides, if necessary; compress the service guides for reduction of consumption of network resources; and maintain the service guides.

Distribute service guides by unicast or multicast.

Stream transmission/File transmission: Detect whether a user terminal has normally received MCBCS contents (in some cases, perform the same function as the MCBCS AS).

Manage multicast groups by location of user terminals.

Process a reception report: If a user terminal reports network conditions by a reception report, reflect the same.

The MCBCS controller 120 is located in the AP. The MCBCS controller 120 is an entity that connects a core network and an access network. The MCBCS controller 120 provides a function for efficiently transmitting an MCBCS service, which is received through the core network, through a radio network; and a function for notifying the start of an MCBCS service to the user terminal. The detailed functions of the MCBCS controller 120 are as follows.

Perform data/time synchronization to provide macro-diversity gain: burst reservation assignment and packet processing.

Manage MBS zones.

Transmit group paging information for notification.

Herein, the MCBCS controller 120 interfaces directly with only the MCBCS server 130, and interfaces with other SPs only through the MCBCS server 130.

The BS 110 is managed by the AP. The BS 110 receives an MCBCS service in a wired fashion and transmits the received MCBCS service in a wireless fashion.

The user terminal 100 receives an MCBCS service through the above network entities and provides the received MCBCS service to the user.

Although not illustrated, a policy server manages Quality of Service (QoS) profile information for each IP flow for a service-requesting terminal.

In FIG. 1, a service area represents an area for which the SP provides an MCBCS service. The MCBCS transmission zone represents a transmission management zone in which the same content is broadcast, which is defined in the service area by the AP for efficient MCBCS transmission. On the other hand, the MBS zone represents a zone in which an MCBCS service flow is available through different Connection Identifiers (CIDs) or different Security Associations (SAs).

Figure 2:
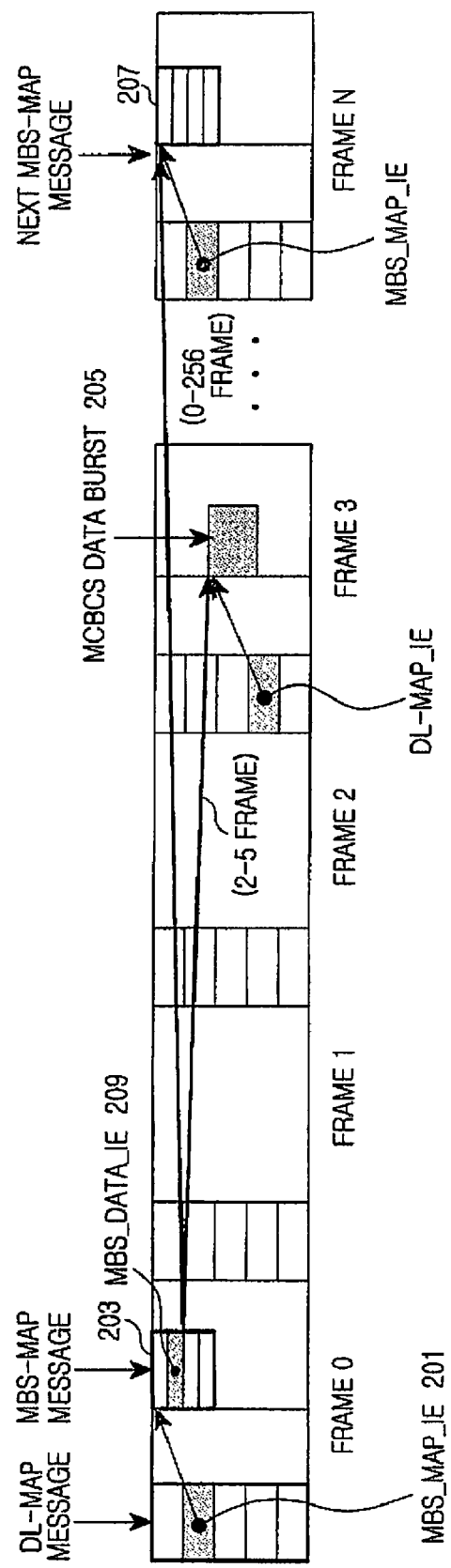
FIG. 2 illustrates a method for transmitting a service guide through a multicast broadcast flow in a BWA system according to a first embodiment of the present invention.

FIG. 2 illustrates a method for transmitting a service guide through a multicast broadcast flow in the BWA system according to a first embodiment of the present invention.

Referring to FIG. 2, a transmitter for an IEEE 802.16 communication system providing an MCBCS service transmits MCBCS data to a plurality of receivers at the same Orthogonal Frequency Division Multiplexing (OFDM) symbol position at the same time in the same frame number in the same coding scheme. In order to allow a receiver located in a boundary area of each service area to obtain a macro diversity effect through radio frequency combining, the transmitter should define an MCBCS burst in a downlink frame and transmit the MCBCS data through the MCBCS burst. The receiver receives an MBS-MAP message including information about an MCBCS burst that it should receive in the downlink frame, to detect the MCBCS burst, thereby receiving the MCBCS data transmitted through the MCBCS burst. Hereinafter, the MAP message transmitting downlink resource allocation information is referred to as a DownLink-MAP (DL-MAP) message.

A downlink frame of the MCBCS-providing communication system can be represented by subchannels and symbols in the frequency and time domains. The downlink frame includes a DL-MAP message, an MBS-MAP message, and a plurality of MCBCS data bursts.

The DL-MAP message includes a DL_MAP_IE for indicating a burst transmitted in the current frame, and further includes an MBS_MAP_IE 201 in the case of providing an MCBCS service. The MBS_MAP_IE 201 provides the position information and the decoding information of an MBS-MAP message 203 in a DL subframe, and each receiver receives the MBS-MAP message 203 through the MBS_MAP_IE 201.

The MBS-MAP message 203 includes an MBS_Data_IE 209. The MBS_Data_IE 209 is used to transmit the location information and decoding information of MCBCS data bursts 205 to a receiver, and the receiver receives MCBCS data through the MCBCS data burst 205 allocated to a specific MCBCS frame by using information included in the MBS_Data_IE 209.

In the service guide transmitting method of FIG. 2, a data burst transmitted by a specific MCID for all zones is used to transmit a service guide through a multicast broadcast flow. That is, a service guide is periodically transmitted by a specific MCID to a user terminal. Herein, all zones may have the same MCID number, but the transmission time, transmission period, and content of a transmitted service guide may vary according to the respective MBS zones. Herein, the transmission period of a service guide may be adjusted depending on the service providers.

For example, the service guide may be a mapping table of MCIDs and broadcast channel IPs. The mapping table is managed in an array fashion, and may include channel IDs (or connection IDs), zone IDs (or MBS zone IDs), broadcast channel IP addresses, and MCIDs (or LCIDs), as illustrated in FIG. 7. For example, the MCID has a constant size of 12 bits (8 bits for the LCID) and the broadcast channel IP address has a constant size of 32 bits. Therefore, the total size of the mapping table can be detected from the number of broadcast channels for each MBS zone. Thus, if the mapping table is transmitted by a specific MCID, only information about the number of broadcast channels is necessary for calculation of the total size of the mapping table and the MBS-MAP message must include information about the size, position and name tag (MCID or LCID) of an MCID data burst. Therefore, it is more advantageous to utilize simpler information for calculation of the size information.

A service guide data burst packet may be generated by the MCBCS server 130 or the ASN-GW 120. Herein, the MCBCS server 130 provides a stream for all data bursts transmitted by the MCID. Therefore, if the MCBCS server 130 generates the service guide data burst packet, it has only to use the stream for the data bursts. On the other hand, the ASN-GW 120 performs packetization to generate a burst size according to MBS zone-based air scheduling (e.g., Permutation, MCS Levels, MIMO or not, Data Transmission Rates, Transmission Periods, Compressed or not, and Broadcast Time/End Management). Also, the ASN-GW 120 has information for the packetization, for example, MCID, broadcast channel IP, and MBS zone-based broadcast channel configuration management information. Therefore, the ASN-GW 120 may also generate the service guide data burst packet. Herein, because the MBS-MAP message must include information about the size, position and name tag (MCID or LCID) of an MCID data burst transmitting the content of the service guide, the MCBCS server 130 or the ASN-GW 120 must provide prior notification of the information to an entity (e.g., the BS 110) that generates the MAP message. In this context, the BS 110 includes the information about the size, position and name tag (MCID or LCID) of the MCID data burst transmitting the content of the service guide in the MBS-MAP message, and transmits the DL-MAP designating the two-dimensional position of the MBS-MAP message to the user terminal 100. Thereafter, the BS 110 transmits an MCBCS burst including a service guide received from the MCBCS server 130 and the ASN-GW to the user terminal 100. The user terminal 100 receives and stores the service guide in a memory.

FIG. 2 illustrates a case of a multi-BS MCBCS capable of obtaining a macro diversity effect. In the case of a single-BS MCBCS, the MPS-MAP massage is not used. That is, the MBS_MAP_IE of the DL-MAP may provide the decoding information and the position information of an MCBCS burst firsthand.

It has been illustrated that the service guide for each zone is transmitted by the data burst of a specific MCID. Alternatively, the service guide for each zone may be transmitted by a Broadcast CID (BCID).

Figure 3:
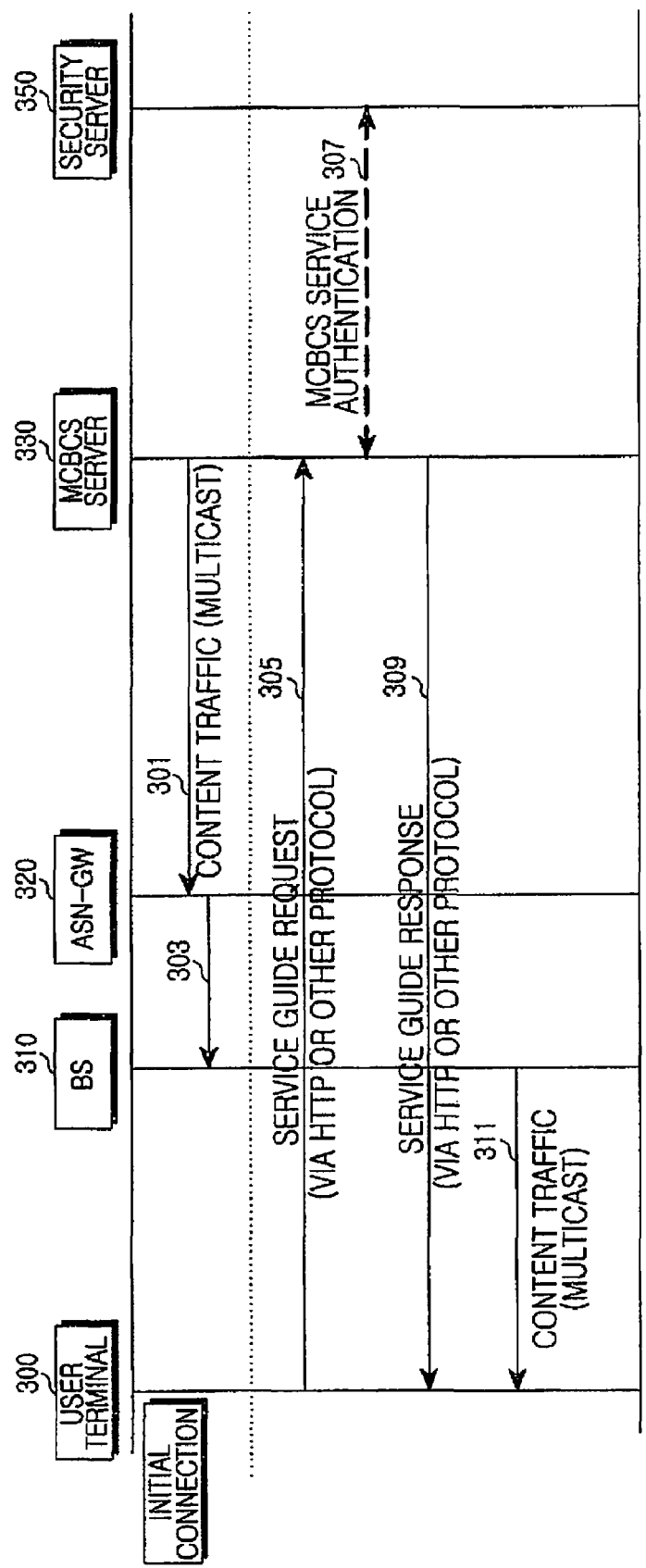
FIG. 3 is a flow diagram illustrating a method for transmitting a service guide to a requesting user terminal through a unicast flow in a BWA system according to a second embodiment of the present invention.

FIG. 3 is a flow diagram illustrating a method for transmitting a service guide to a requesting user terminal through a unicast flow in a BWA system according to a second embodiment of the present invention.

Referring to FIG. 3, an MCBCS server 330 multicasts an MCBCS content traffic to an ASN-GW 320 in step 301. In step 303, the ASN-GW 320 multicasts the received MCBCS content traffic to a Base Station (BS) 310.

In step 305, a user terminal 300 transmits a service guide request message through an application layer to the MCBCS server 330 in response to the request for a service guide (e.g., a mapping table of MCIDs versus broadcast channel IPs) according to the user's key manipulation. Herein, the service guide request message includes a user terminal IP and a BS ID. At this point, the MCBCS server 330 may or may not perform an MCBCS authentication process with a security server 350. That is, a service guide response message, which includes only a service guide corresponding to an MBS zone for the user terminal 300, all the allowable MBS zones for the user terminal, or all the MBS zones selected by the user terminal within the limit allowable for the user terminal, may be transmitted to the user terminal 300. Alternatively, an MCBCS General Traffic Encryption Key (GTEK) value may be transmitted simultaneously with the service guide through the MCBCS authentication process with the security server 350, so that a desired channel can be monitored only by using the MCBCS GTEK value, that is, the corresponding service authorization key value.

In other words, if the MCBCS server 330 does not perform an MCBCS authentication process with the security server 350, it searches a service guide corresponding to an MBS zone for the user terminal 300, all the allowable MBS zones for the user terminal, or all the MBS zones selected by the user terminal within the limit allowable for the user terminal, and proceeds directly to step 309. In step 309, the MCBCS server 330 transmits a service guide response message including the searched service guide to the user terminal 300.

On the other hand, if the MCBCS server 330 performs an MCBCS authentication process with the security server 350, it performs an MCBCS authentication process with the security server 350 in step 307. Herein, the MCBCS authentication process may be performed by transmitting an MCBCS authentication request including a user terminal ID from the MCBCS server 330 to the security server 350; and then transmitting an MCBCS authentication response message from security server 350 to the MCBCS server 330. Herein, the MCBCS authentication response message includes a random seed value for generation of an MCBCS authorization key (i.e., an MCBCS GTEK) for encryption/decryption of broadcast channel IPs authorized for each service class of the user terminal 300; a GTEK lifetime value for informing the effective period of the MCBCS GTEK; an MCBCS root key value and an MCBCS channel/content Key Encryption Key (KEK) value generated by the security server for encryption/decryption of the MCBCS GTEK; a terminal-unique random seed value for generation of an MCBCS root key and an MCBCS channel content KEK in the user terminal; a key lifetime value for informing the effective periods of the MCBCS root key and the MCBCS channel content KEK; and MCBCS service class information of the user terminal. Alternatively, the MCBCS authentication process may be performed periodically. In other words, the MCBCS server 330 may manage the authentication information and update the MCBCS authentication information according to the periodic trigger of the security server 350.

After completion of the authentication process, the MCBCS server 330 searches a database for a service guide (e.g., a mapping table of MCIDs versus broadcast channel IPs) corresponding to an MBS zone for the user terminal 300, all the allowable MBS zones for the user terminal, or all the MBS zones selected by the user terminal within the limit allowable for the user terminal; generates an MCBCS GTEK for broadcast channel IPs authorized for each service class of the user terminal 300 by using a random seed value received from the security server 350; encrypts the generated MCBCS GTEK by using an MCBCS root key and an MCBCS KEK value received from the security server 350; and transmits a service guide response message to the user terminal 300 in step 309. Herein, the service guide response message includes a mapping table for broadcast channel IPs authorized for each service class of the user terminal 300 among the searched mapping table; the encrypted MCBCS GTEK; a terminal-unique random seed value for generation of an MCBCS root key and an MCBCS channel content KEK in the user terminal; and the key lifetime values of the MCBCS GTEK/the MCBCS root key/the MCBCS KEK. Herein, the service guide response message may include a broadcast time table as information about a broadcast time for each broadcast channel.

For example, the service guide request message and the service guide response message are transmitted by a unicast flow via Hyper Text Transfer Protocol (HTTP) or other protocols. Upon receipt of the service guide response message, the user terminal 300 may store the service guide in a memory and transmit ACK/NACK to the MCBCS server 330. If the ACK/NACK transmission process is performed, when the NACK is received, the MCBCS server 330 may perform the corresponding retransmission. On the other hand, if the ACK/NACK transmission process is not performed, when the user terminal 300 fails to receive the service guide, the user can not determine whether a retransmission request or abandonment is appropriate.

In step 311, the user terminal 300 receives the multicast MCBCS content traffic corresponding to an MCID flow for the user-selected channel from the base station 310. Herein, the received traffic is displayed on a user interface after passing through a PHY layer and a MAC layer through the path of the flow.

The embodiment of FIG. 3 can effectively reduce a waste of resources when the number of MBS zones is small and each MBS zone covers a broad area. Also, the mapping table may be transmitted at the request of the user terminal, or may be transmitted to the user terminal at the request of the security server, the MCBCS server, or the policy server.

Figure 4:
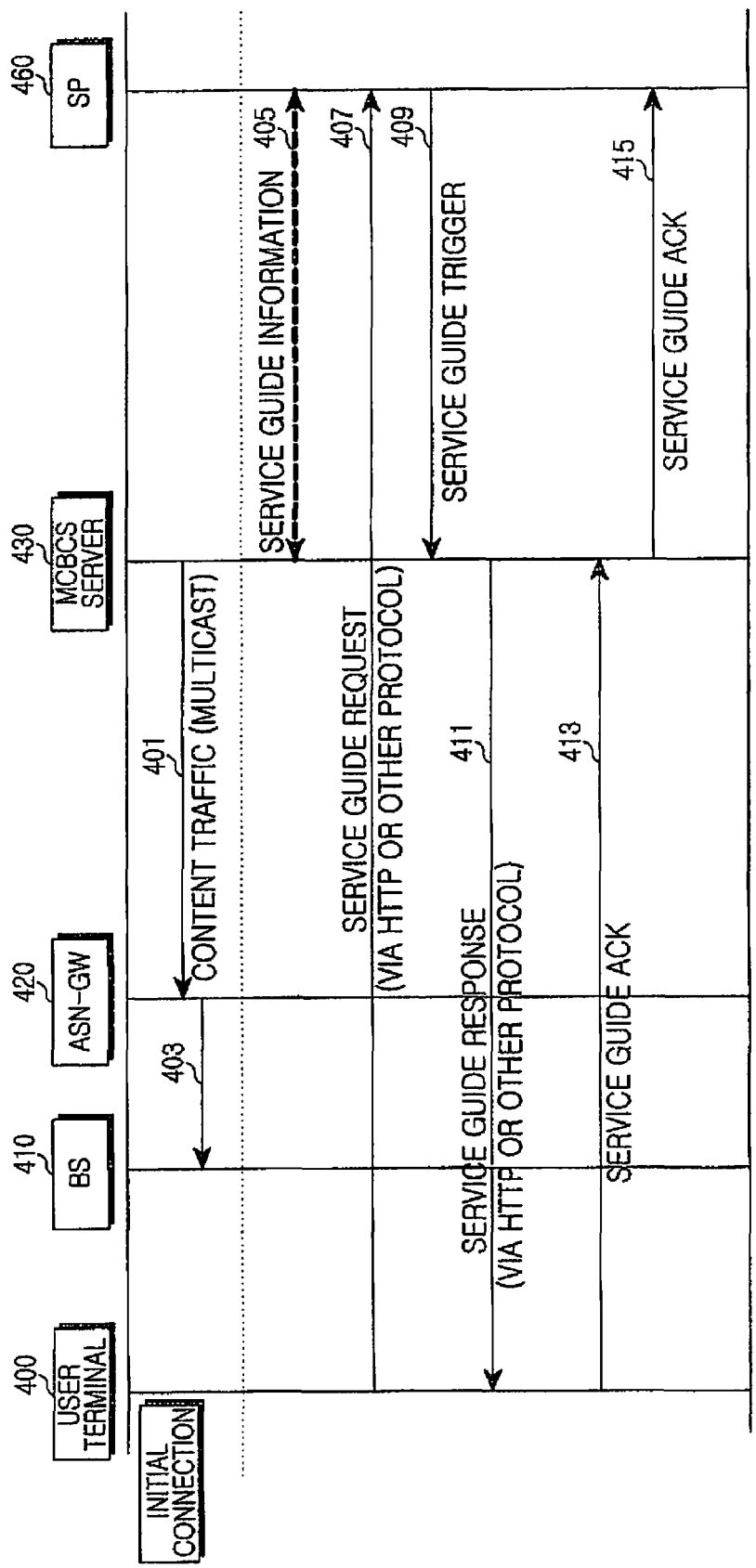
FIG. 4 is a flow diagram illustrating a method for transmitting a service guide by connection with a service provider in a BWA system according to a third embodiment of the present invention.

FIG. 4 is a flow diagram illustrating a method for transmitting a service guide by connection with a Service Provider (SP) in a BWA system according to a third embodiment of the present invention.

Referring to FIG. 4, an MCBCS server 430 multicasts an MCBCS content traffic to an ASN-GW 420 in step 401. In step 403, the ASN-GW 420 multicasts the received MCBCS content traffic to a Base Station (BS) 410.

Herein, the MCBCS server 430 can communicate with at least one Service Provider (SP) 460 through a cellular network. In step 405, the MCBCS server 430 periodically receives service guide information such as a service guide content and a service guide transmission format from the SP 460. For example, the service guide transmission format for a table of broadcasting information is the same as is transmitted to the user. The service guide transmission format for authentication information may be the same as a general security format (random seed or double encryption). The service guide transmission format for a mapping table may use broadcast zone allocation information, broadcast table information, and a mapping table style. Herein, the SP 460 is an entity that recruits subscribers and charges a fee for a broadcast service.

In step 407, a user terminal 400 transmits a service guide request message to the SP 460 in response to the request for a service guide according to the user's key manipulation. Herein, the service guide request message includes a user terminal IP and a BS ID. In step 409, the SP 460 triggers the MCBCS server 430 to transmit a service guide to the user terminal 300 through a wireless network.

In step 411, the MCBCS server 430 generates a service guide based on the service guide content, allocates a name tag for a MAC layer with respect to an application layer and an MBS zone, generates a service guide response message including a service guide requested by the user terminal 400, and transmits the generated service guide response message to the user terminal 400 in accordance with the corresponding transmission format. At this point, the user terminal 400 stores the service guide in a memory.

Upon successful reception of the service guide response message, the user terminal 400 transmits a service guide Acknowledgement (ACK) indicating the successful transmission of the service guide response message to the MCBCS server 430 in step 413. In step 415, the MCBCS server 430 transmits the service guide ACK to the SP 460.

In another embodiment, the SP 460 may transmit a service guide directly to the user terminal 400 at the service guide request of the user terminal 400. In this case, the user terminal 400 transmits the service guide ACK directly to the SP 460.

Figure 5:
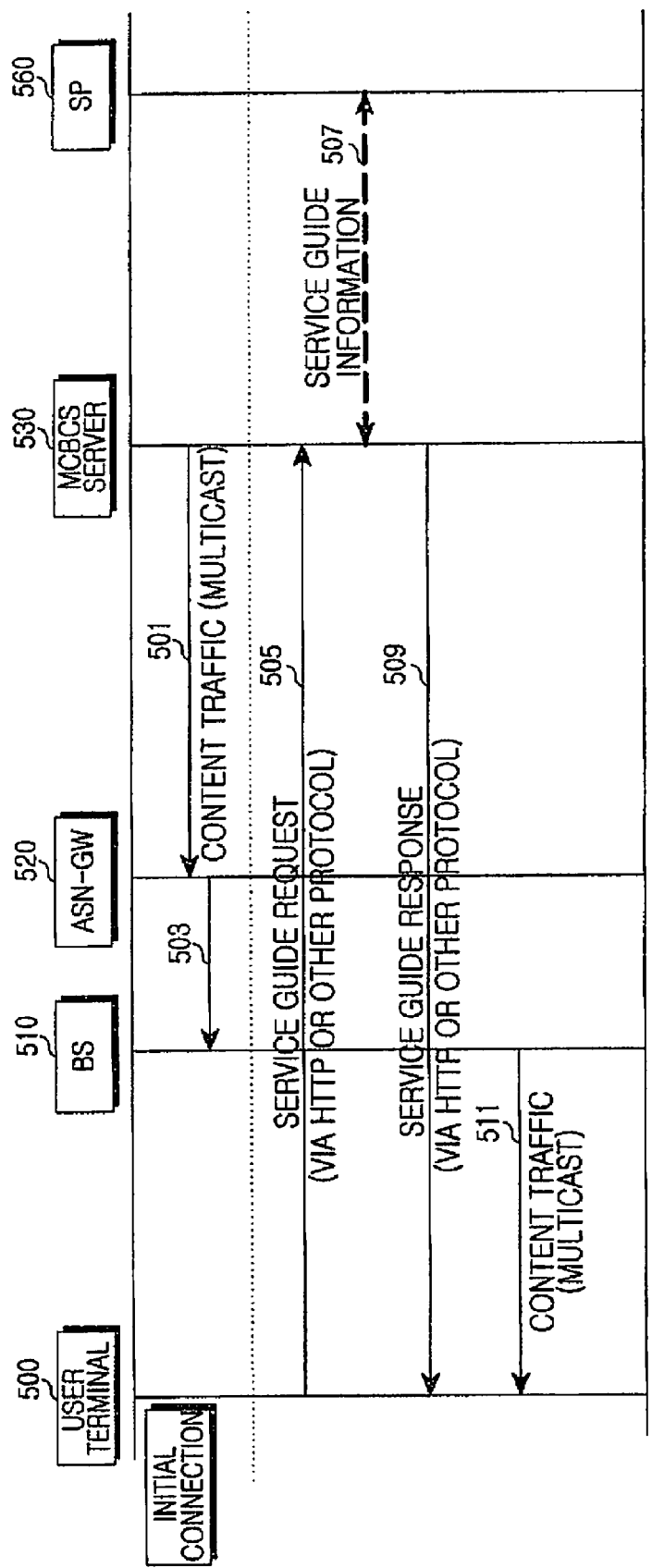
FIG. 5 is a flow diagram illustrating a method for transmitting a service guide by connection with a service provider in a BWA system according to a fourth embodiment of the present invention.

FIG. 5 is a flow diagram illustrating a method for transmitting a service guide by connection with an Service Provider (SP) in a BWA system according to a fourth embodiment of the present invention.

Referring to FIG. 5, an MCBCS server 530 multicasts an MCBCS content traffic to an ASN-GW 520 in step 501. In step 503, the ASN-GW 520 multicasts the received MCBCS content traffic to a Base Station (BS) 510.

In step 505, a user terminal 500 transmits a service guide request message to the MCBCS server 530 in response to the request for a service guide according to the user's key manipulation. Herein, the service guide request message includes a user terminal IP and a BS ID.

In step 507, the MCBCS server 530 communicates with at least one SP 560 to receive service guide information (e.g., a service guide content and a service guide transmission format) from the SP 560. Herein, the service guide information may be received in step 507 or may be beforehand received prior to step 505.

In step 509, the MCBCS server 530 generates a service guide based on the service guide information, generates a service guide response message including the service guide, and transmits the service guide response message to the user terminal 500 in accordance with the corresponding transmission format. At this point, the user terminal 500 stores the service guide in a memory.

In step 511, the user terminal 500 receives the multicast MCBCS content traffic corresponding to an MCID flow for the user-selected channel from the base station 510. Herein, the received traffic is displayed on a user interface after passing through a PHY layer and a MAC layer through the path of the flow.

Figure 6:
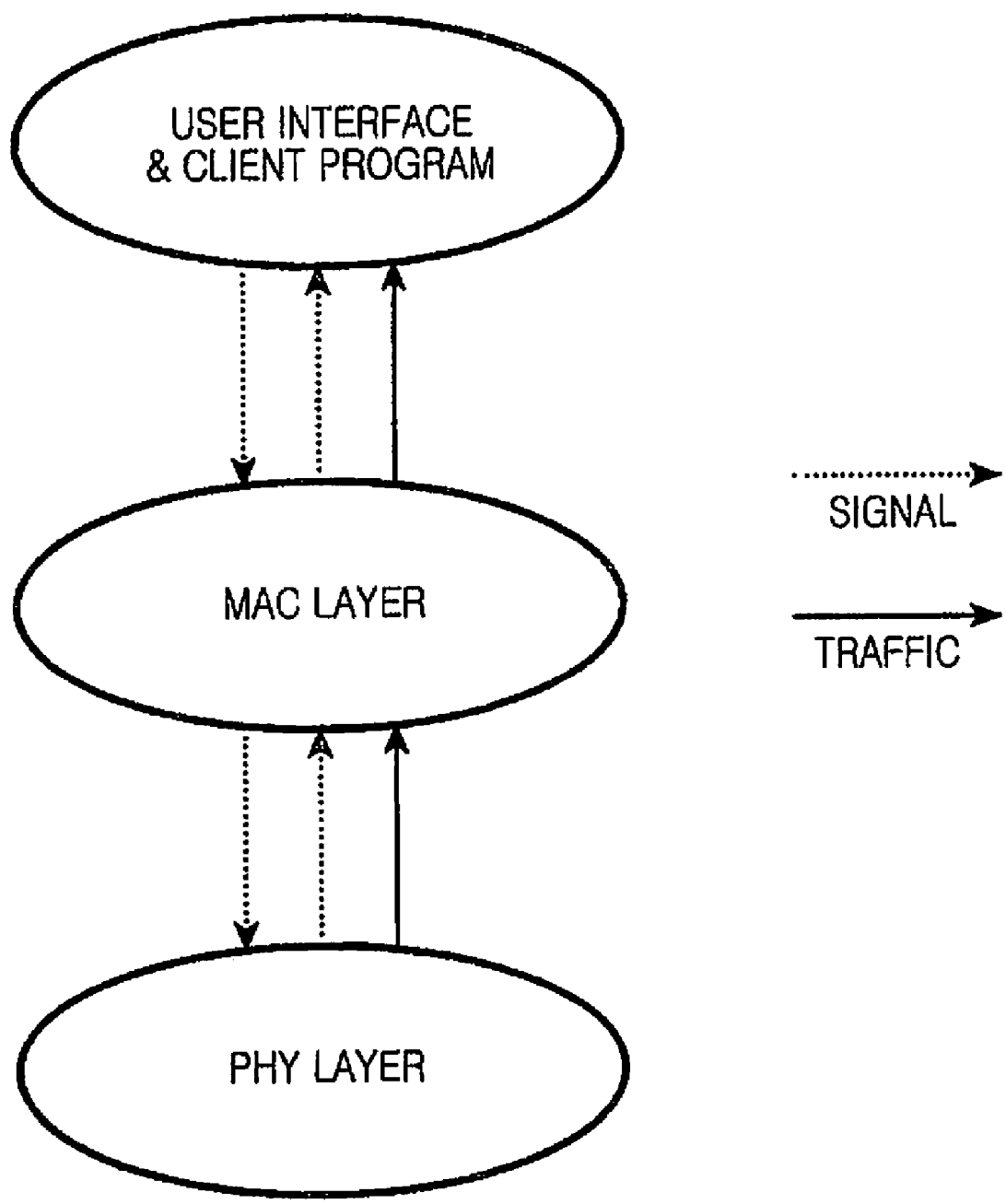
FIG. 6 illustrates an internal operation of a user terminal according to the present invention.

Meanwhile, a client program, which is located in an application layer of the user terminal according to the present invention, manages a mapping table of application layer name tags versus IP layer name tags or MAC layer name tags with respect to broadcast channels. Also, when the user selects, changes or deletes a broadcast channel (or broadcast contents), the client program commands the corresponding operation while communicating with the user terminal, as illustrated in FIG. 6.

For example, when the user selects a broadcast channel, the application layer transmits a MAC layer name tag corresponding to the broadcast channel to a MAC layer and commands the MAC layer to receive and transmit data of the corresponding channel to the application layer. Also, when the user changes a broadcast channel, the application layer transmits MAC layer name tags corresponding to a previous broadcast channel and a new broadcast channel to a MAC layer, stops reception of data of the previous broadcast channel, and commands the MAC layer to receive and transmit data of the new broadcast channel to the application layer. Herein, the MAC layer commands a physical (PHY) layer to open a physical port and receive the corresponding MCID (or LCID) flow. To this end, a signaling request (REQ) and a signaling response (RSP) are transmitted/received between the respective layer interfaces. Alternatively, there may be an ACK signal. When the signaling operations are all performed well as above, a flow path is generated and the received data is displayed on a user interface through the MAC layer in the PHY layer. Also, when the user deletes a broadcast channel, the application layer transmits a MAC layer name tag corresponding to the broadcast channel to a MAC layer and commands the MAC layer to stop reception of data of the corresponding channel.

In this way, the MAC layer transmits a response (RSP) signal to the application layer in response to the request (REQ) signal of the application layer for selection, change or deletion of the broadcast channel. The response signal may include a MAC layer name tag included in the request signal or a corresponding IP layer name tag, upon reception of the originally requested name tag, to the MAC layer. In this case, the application layer transmits a detection signal, which includes the results of whether the name tag included in the response signal is identical to the originally requested name tag, to the MAC layer. Herein, the MAC layer performs the process requested by the application layer only when the detection signal is an ACK signal. If the application layer fails to receive the response (RSP) signal or if the response signal is received but the received name tag is different from the requested name tag, the application layer retries the corresponding request (REQ) process. In this case, in the above detection process, the request process may be retried by including the corresponding MAC layer name tag or IP layer name tag in a message for the detection process.

Alternatively, the MAC layer of the user terminal receives all MCBCS data from the base station, and transmits all the MCBCS data or only the data corresponding to the MAC layer name tag, which is commanded to be transmitted from the application layer, to the application layer. At this point, the application layer can select a necessary broadcast channel because it manages the mapping table.

FIG. 6 illustrates an operation of the user terminal when there is a mapping table of MAC layer name tags versus application layer name tags. However, when there is a mapping table of IP layer name tags versus application layer name tags, the application layer of the user terminal transmits an IP layer name tag to the IP layer and commands the IP layer to transmit a flow of the corresponding channel to the application layer. At this point, the IP layer commands the MAC layer to receive flows of all the MCIDs in the corresponding MBS zone and transmit the received flows to the IP layer. The IP layer selects only the IP flow requested by the application layer among the received flows, and discards/transmits the remaining flows to the application layer.

In another embodiment, although not defined in the IEEE 802.16 standards, a broadcast message, for example, a DCD message may be used to transmit a service guide. That is, if the user terminal transmits a service guide transmission request to the MCBCS server through the application layer, the MCBCS server triggers the base station to generate a broadcast message including a service guide and to transmit the broadcast message to the user terminal. Herein, information about the service guide is received from the MCBCS server or a Wireless Broadband (WiBro) System Manager (WSM). The DCD message is a broadcast message that the base station broadcasts to transmit MBS zone information to the user terminal. When the base station uses the DCD message to transmit a service guide, for example, all the MBS flows in the MBS zone, the MCID flow need not be updated at each handover of the user terminal.

In still another embodiment, a Dynamic Service Addition (DSA) process may be used to transmit a service guide. That is, when the user terminal transmits a service guide transmission request to the MCBCS server through the application layer, the MCBCS server transmits a DSA request trigger message for triggering transmission of a service guide to the ASN-GW. Then the ASN-GW transmits the DSA request trigger message to the base station. According to the triggering of the ASN-GW, the base station generates a DSA request message including the service guide and transmits the generated DSA request message to the user terminal. In another method, the user terminal transmits a DSA request message for transmission of a service guide to the base station. When the DSA request message is transmitted to the ASN-GW and to a policy server through the function of authentication, authorization and accounting if necessary, the policy server transmits a DSA response trigger message to the ASN-GW. Then the ASN-GW transmits the DAS response trigger message to the base station, thereby triggering the base station to transmit a DSA response message including the service guide to the user terminal. In this way, when all the MCID flows in the MBS zone are transmitted through the DSA response message, the user terminal may receive the MCID flows through one DSA process or through the successive DSA processes for as many as the number of the MCIDs.

In still another embodiment, an MBS-MAP message defined in the IEEE 802.16 standards may be used to transmit a service guide. That is, the user terminal may obtain the service guide by reading all the MBS-MAP messages for base stations that have a transmission period of up to 256 frames.

Herein, the MBS zone ID and the MCID may be managed by all of the client program, the MAC layer, and the PHY layer.

As illustrated, the MCBCS server transmits to the user terminal a mapping table for corresponding to an MBS zone for the user terminal, all the allowable MBS zones for the user terminal, or all the MBS zones selected by the user terminal within the limit allowable for the user terminal. There is a case where the service provider uses narrow zones and transmits a mapping table for each zone. In this case, when a user terminal moves from a zone to another zone, the user terminal must detect the fact to request a new mapping table to the MCBCS server. In this case, the MCBCS server transmits a mapping table for all the MBS zones, instead of only a mapping table for the corresponding zone, to the user terminal. At this point, because the MCIDs may be different for the respective MBS zones with respect the same broadcast content, the mapping table furthers includes an MBS zone ID.

It has been illustrated that the MCIDs are one-to-one correspondence with the broadcast channel IPs. Alternatively, a plurality of broadcast channel IPs are mapped to one MCID.

The broadcast channel IPs, the LCIDs, and the content IDs have a 1:1:1 mapping relationship, and the MCIDs and the LCIDs have a 1:1 or 1:N mapping relationship. Thus, the MCIDs and the broadcast channel IPs may have a 1:N mapping relationship. That is, a plurality of broadcast channel IPs may be mapped to one MCID. Also, the MCIDs and the broadcast channel IPs have a 1:1 mapping relationship, the MCIDs and the LCIDs have a 1:N mapping relationship, and the LCIDs and the broadcast channel IPs have a 1:1 mapping relationship. Thus, N broadcast contents may be mapped into one broadcast channel IP. That is, a plurality of broadcast contents may be mapped to one MCID or one broadcast channel IP.

The service guide request message transmitted from the user terminal to the MCBCS server may include a request for traffic information such as a data transmission rate for management of an MCBCS traffic in the user terminal. In this case, the MCBCS server may transmit a service guide response message, which includes the traffic information for the respective broadcast channels included in the service guide, to the user terminal.

The MCID and the broadcast channel IP may be managed separately from each other. For example, the MCBCS server receives a corresponding MCID from an MCID management database and transmits a service guide for broadcast channels or contents allowable for the corresponding MCID to the user terminal.

When MCIDs (or LCIDs) are uniquely allocated to specific broadcast channels such as nationwide broadcast channels, that is, when they are set to globally unique values even in the case of different MBS zones, the broadcast contents can be received without additional information update for the channels even when the terminal moves between base stations in different MBS zones. To this end, the MCID (or LCID) for each MBS zone may be transmitted to the user terminal through the service guide response message, the DCD message, or the DSA process, carrying information about whether they are globally unique values. In this way, for nationwide broadcast channels, even when the user terminal moves between MBS zones, the user terminal continues to receive a broadcast using the same MCID (or terminates broadcast reception when moving between zones). For local broadcast channels, when the same contents are present in a new zone, the user terminal continues to receive a broadcast using the corresponding MCID in a mapping table of the new zone (or terminates broadcast reception when moving between zones).

The user terminal IP described above is an example of Network Access Identification (NAI). The NAI corresponds to a user ID or a terminal ID. Another example of the NAI is a unique MAC address of a user terminal.

The broadcast channel described above may represent a broadcast station such as Korean broadcasters KBS, MBC, and SBS, or may represent contents such as news, dramas, and movies provided by each broadcast station. Likewise, the MCID or the LCID may represent a base station or broadcast contents.

The MCBCS server described above may be one network entity. Alternatively, the MCBCS server may be divided into a plurality of network entities according to Access Service Providers (ASPs) (e.g., KT, SKT, Sprint) and Broadcast Service Providers (BSPs) (e.g., KBS, MBC, Naver, or general broadcast providers), in order to divide/manage a variety of software function blocks such as multicast traffic generation, mapping table generation, broadcast table generation, encryption keys, random seeds, and key lifetimes. Network entities managed by the ASP and the BSP are referred to herein as a Core Service Network (CSN).

The configuration of the mapping table according to the present invention may change depending on the policies of service providers, and the change time may be determined in consideration of the MCBCS GTEK refresh time. For example, the MCBCS GTEK refresh operation may be performed daily or weekly in a non-broadcast time zone, and the MCBCS server may change the configuration of the mapping table before generation of the MCBCS GTEK in the non-broadcast time zone. After change of the mapping table, the MCBCS server notifies information about the changed mapping table to the ASN-GW supporting all the MCBCSs so that the ASN-GW can update the necessary information. In particular, the mapping information for an application layer name tag and a MAC layer name tag for each MBS zone ID must be updated periodically because it is managed by the ASN-GW.

When the MAC layer uploads traffic to the application layer, it may use a new name tag, not a MAC layer name tag received from the application layer, in order to discern the traffic from other traffic. Herein, the new name tag may be a name tag with a small size that is 1:1 mapped to the MAC layer name tag. This reduces overhead resulting from the large size of the MAC layer name tag, and discerns all the traffic channels between the application layer and the MAC layer in the user terminal.

An operation of the user terminal for support of a seamless MCBCS service for its movement between base stations or between sectors is as follows. Herein, it is assumed that the user terminal can know whether the base station provides an MCBCS service and to which MBS zone it belongs. According to the IEEE 802.16 standards, an MBS zone ID is transmitted to a user terminal through a DCD message. When an MBS zone ID (=0) is received, the user terminal can know that the corresponding base station does not support an MCBCS service.

First, an algorithm for the application layer of a user terminal managing a mapping table of MAC layer name tags versus application layer name tags is as follows. Based on the DCD message, the user terminal determines whether a new BS supports an MCBCS service. If the new BS supports an MCBCS service, the user terminal checks whether a currently received MBS zone ID is identical to the previously received MBS zone ID, i.e., whether there is no change in the MBS zone. If the currently received MBS zone ID is identical to the previously received MBS zone ID, the user terminal continues to receive MCBCS contents through the corresponding BS. On the other hand, if the currently received MBS zone ID is different from the previously received MBS zone ID, the user terminal checks whether the MAC layer name tag has a unique value for nationwide broadcast. If the MAC layer name tag has the unique value, the user terminal checks a mapping table of the corresponding MBS zone by using the MBS zone ID of a new BS. At this point, if the corresponding mapping table includes a MAC layer name tag identical to the MAC layer name tag for the previous broadcast channel, the corresponding MAC layer name tag is used to continue to receive MCBCS contents. If not, the user terminal deletes the previous broadcast channel. On the other hand, if the MAC layer name tag does not have the unique value, the user terminal deletes the previous broadcast channel. On the other hand, if the new BS does not support an MCBCS service, the user terminal displays the fact of the non-broadcast region on a display unit. In the above algorithm, when the application layer of the user terminal downloads a MAC layer name tag to the MAC layer, it provides notification of information about whether the corresponding MAC layer name tag has a unique value for nationwide broadcast.

Second, an algorithm for the application layer managing a mapping table of IP layer name tags versus application layer name tags is as follows. Based on the DCD message, the user terminal determines whether a new BS supports an MCBCS service. If the new BS supports an MCBCS service, the user terminal checks whether a currently received MBS zone ID is identical to the previously received MBS zone ID. If the currently received MBS zone ID is identical to the previously received MBS zone ID, the user terminal continues to receive MCBCS contents. On the other hand, if the currently received MBS zone ID is different from the previously received MBS zone ID, the user terminal checks a mapping table of the corresponding MBS zone by using the MBS zone ID of a new BS. At this point, if the corresponding mapping table includes a broadcast channel IP identical to the broadcast channel IP for the previous broadcast channel, the corresponding broadcast channel IP is used to continue to receive MCBCS contents. If not, the user terminal deletes the previous broadcast channel. On the other hand, if the new BS does not support an MCBCS service, the user terminal displays the fact of the non-broadcast region on a display unit.

In the case of WiMAX, a MAC layer name tag for a multicast broadcast flow is an MCID or an LCID, and a MAC layer name tag for a broadcast flow is a BCID. Herein, the MAC layer name tag transmitting a service guide is notified to users as the following four types of schemes. In the first scheme, the MAC layer name tag is transmitted through a broadcast MAC message (for WiMAX, DL-MAP, DCD, NBR-ADV (NeighBoR-ADVertisement), TRF-IND (TraFfic-INDication) or PAG-ADV (PAGing-ADVertisement)). In the second scheme, the MAC layer name tag is fixed at a predetermined value and it is specified in the standards (for WiMAX, MCID=0 or BCID=0). In the third scheme, an additional parameter is provided for transmission of an SP list to specify the MAC layer name tag transmitting a service guide (for WiMAX, transmission of an SP list through an air channel is defined in the IEEE 802.16g standard, and an additional parameter is provided to notify the value of MCID, LCID or BCID). In the fourth scheme, the user requests and obtains the MAC layer name tag from the SP or the MCBCS server through a unicast flow. In the last scheme, each SP predefines the MAC layer name tag in the user terminal.

The present invention may use different transmission methods for the respective service guides. For example, a service guide I (including a table of broadcasting or a mapping table of IP layer name tags versus application layer name tags) is transmitted through a broadcast flow, and a service guide II (including authentication information or a mapping table of IP layer name tags versus MAC layer name tags) is transmitted through a multicast broadcast flow or through a unicast flow.

Another service guide transmission method is as follows. First, one or more user terminals join a multicast group through IGMP (Internet Group Management Protocol), and the MCBCS server generates a group ID for a predetermined group and triggers the ASN-GW to transmit a service guide to the corresponding group. In connection with the base station, the ASN-GW generates a Broadcast Connection ID (BCID) or a unicasT Connection ID (TCID); notifies, through a MAC connection process (or a DSA process), the BCID or the TCID to user terminals designated by the MCBCS server; and transmits the service guide received from the MCBCS server to user terminals of a multicast group through the BCID or the TCID.

If an MBS-MAP message is not transmitted to the user terminal, the user terminal cannot read contents broadcast by the base station. Thus, the MBS-MAP message must be transmitted in real time without loss. To this end, the base station may be an entity that generates the MBS-Map message. Alternatively, the ASN-GW may be an entity that generates the MBS-Map message. In this case, the total broadcast service quality may decrease due to a transmission delay or a transmission error between the ASN-GW and the base station. However, the input contents of the MBS-MAP message, which change statically, are set by the service provider and are transmitted in the order of the MCBCS server→the ASN-GW→the base station or in the order of the WSM (WiBro System Manager)→the base station. In the case of a single-BS MCBCS service using an AMC (Adaptive Modulation and Coding) scheme where a burst size changes dynamically during the transmission of broadcast contents, an RF scheduler of the base station must generate the MBS-MAP message firsthand.

The present invention varies air scheduling-related information and ID resource indication information depending on the service types. Herein, all the MBS zone IDs provided by the corresponding subcell are listed in the DCD message.

First, an MCBCS type provided by an MBS zone ID is indicated in the MBS zone ID or in an independent manner. For example, if the MBS zone ID is not 0, a multi-BS, a single-BS not using an AMC scheme, a single-BS using an AMC scheme and a static transmission operation, and a single-BS using an AMC scheme and a dynamic transmission operation are indicated in an independent manner. Herein, the term 'static transmission operation' denotes transmitting broadcast contents for a broadcast time period regardless of the presence of broadcast reception users. The term 'dynamic transmission operation' denotes determining whether to transmit broadcast contents depending on the presence of broadcast reception users. The AMC and dynamic transmission operation is used for only a single-BS but is not used for a multi-BS, the indication of which requires 2 bits. If the MBS zone ID is 0, it denotes a subcell not providing an MCBCS service. The single-BS not using an AMC scheme may be subdivided into a single-BS not supporting an AMC scheme and a static transmission operation and a single-BS not supporting an AMC scheme and a dynamic transmission operation. In this case, because the total number is 5, 3 bits are required for the above indication.

Second, the number of transmission groups in an MBS zone ID is indicated in the MBS zone ID or in an independent manner. Herein, the transmission time may be indicated for each transmission group. For example, one or more of a transmission start frame, a transmission period, and a transmission rate may be indicated additionally. Herein, the transmission group represents a set of broadcast channels in an MBS zone that have the same transmission start frame, the same transmission period, and the same air scheduling (e.g., permutation and AMC). Each MBS zone can have up to 256 transmission groups. However, for efficient management, it is preferable that the maximum number of transmission groups in an MBS zone is limited to 4 or 8.

Lastly, if a service guide is transmitted in a MAC layer name tag (MCID or LCID), the type of the MAC layer name tag is indicated. For example, it may be indicated whether a MAC layer name tag is valid in only a MBS zone, in all MBS zones, or in some of all the MBS zones. In the last case, an MBS zone ID may be used to indicate in which MBS zone the MAC layer name tag is valid. Herein, the service guide may be transmitted using a separate transmission group of an MCID burst for each MBS zone ID, or may be transmitted at predetermined periods for each transmission group. When the separate transmission group is used, the first transmission group is used to transmit the service guide. When the service guide is transmitted at predetermined periods for each transmission group, it may be transmitted for every transmission group or may be transmitted at predetermined periods for each transmission group in consideration of an overhead. Herein, the contents of the service guide basically include all the channel information of an MBS zone or a transmission group. Also, the contents of the service guide may further include the encryption, the compression of an IP header for each MBS zone or each broadcast channel, and compression type information.

Meanwhile, the broadcast table and the mapping table according to the present invention may also include an MCBCS transmission zone ID as well as N MBS zone ID.

As described above, the present invention provides an apparatus and method for transmitting a service guide, which includes a mapping table of application layer name tags versus IP layer name tags or MAC layer name tags with respect to broadcast channels, a table of broadcasting information, authentication information, an actual broadcast channel name mapped to an application layer name tag, and a combination thereof, in a BWA system through a multicast broadcast flow, a broadcast flow, or a unicast flow. Thus, a user terminal need not additionally perform an MCID/broadcast channel IP mapping operation when it moves between base stations in the same MBS zone. Also, when a broadcast channel IP is uniquely allocated to specific broadcast channels such as nationwide broadcast channels, the broadcast contents of the specific broadcast channels can be received without additional information update even in the case of the movement between base stations in different MBS zones. That is, a seamless MCBCS service can be provided even in different MBS zones. Also, a variety of factors necessitating the maintenance of an awake state of the user terminal is eliminated, thereby preventing a waste of power, which may be caused by periodic uplink transmission due to the awake state of the user terminal, and a waste of air resources necessary for a signaling process. Also, the present invention provides the connection process scheme and the best efficient architecture for generating and transmitting the service guide through the MCBCS server to the user terminal even in the case of the presence of various SPs, thereby increasing the competitiveness for radio broadcast technology.

Although the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for receiving a service guide for a user terminal in a broadband wireless access system, the method comprising:

transmitting, by the user terminal, a service guide request message to a MultiCast and BroadCast Service (MCBCS) server; and receiving, from the MCBCS server, a service guide response message including a mapping table, wherein the mapping table identifies application layer name tags versus Medium-Access Control (MAC) layer name tags with respect to broadcast channels, each of the MAC layer name tags being a Multicast Connection IDentifier (MCID) and each of the application layer name tags being a broadcast channel Internet Protocol (IP).

2. The method of claim 1, wherein the service guide response message further includes at least one of a table of broadcasting information, authentication information, and an actual broadcast channel name mapped to at least one of the application layer name tags.

3. The method of claim 1, wherein at least one of the MAC layer name tags includes at least one of the MCID, a Multicast and Broadcast Service (MBS) zone ID, and a Logical Channel ID (LCID), and wherein at least one of the application layer name tags includes at least one of the broadcast channel IP, a content ID, a broadcast channel ID, a broadcast station ID, a Service Provider (SP) ID, and a content IP.

4. The method of claim 1, wherein transmitting the service guide request message to the MCBCS server comprises transmitting the service guide request message through an application layer.

5. The method of claim 4, wherein the application layer includes a Hyper Text Transfer Protocols (HTTP).

6. The method of claim 1, wherein receiving the service guide response message comprises receiving the service guide response message through an application layer.

7. The method of claim 1, further comprising:

performing, by the MCBCS, an authentication process with a security server, such that the service guide response message further includes authentication information.

8. The method of claim 1, further comprising:

receiving, by the MCBCS server, service guide information from a Service Provider (SP); and generating, by the MCBCS server, the service guide response message including the mapping table, based on the received service guide information from the SP.

9. The method of claim 8, wherein the SP periodically transmits the service guide information to the MCBCS server.

10. The method of claim 8, wherein the service guide information includes at least one of a service guide content and a service guide transmission format.

11. The method of claim 1, wherein the mapping table corresponds to an MBS zone for the user terminal.

12. The method of claim 1, wherein the mapping table corresponds to all allowable MBS zones for the user terminal.

13. The method of claim 1, wherein the mapping table corresponds to all MBS zones selected by the user terminal within an allowable limit for the user terminal.

14. The method of claim 1, wherein the service guide request message includes at least one of a user terminal IP and a BS ID.

15. A method for receiving a service guide for a user terminal in a broadband wireless access system, the method comprising:

transmitting, by the user terminal, a service guide request message to a Service Provider (SP); and receiving, from a MultiCast and BroadCast Service (MCBCS) server, a service guide response message including a mapping table, wherein the mapping table identifies application layer name tags versus Medium Access Control (MAC) layer name tags with respect to broadcast channels, each of the MAC layer name tags being a Multicast Connection IDentifier (MCID) and each of the application layer name tags being a broadcast channel Internet Protocol (IP).

16. The method of claim 15, further comprising:
receiving, by the MCBCS server, service guide information from the SP; and
generating, by the MCBCS server, the service guide response message including the mapping table, based on the received service guide information from the SP.

17. The method of claim 16, wherein the SP periodically transmits the service guide information to the MCBCS server.

18. The method of claim 16, wherein the SP transmits the service guide information to the MCBCS server in response to the service guide request message received from the user terminal.

19. An apparatus for receiving data for a user terminal in a broadband wireless access system, the apparatus comprising:

an application layer unit for transmitting a Medium Access Control (MAC) layer name tag corresponding to a broadcast channel and receiving data corresponding to the broadcast channel; and a MAC layer unit for receiving the MAC layer name tag from the application layer unit, commanding a PHYsical (PHY) layer unit to receive a flow corresponding to the MAC layer name tag, receiving the flow from the PHY layer unit, and transmitting the data corresponding to the flow to the application layer unit.

20. The apparatus of claim 19, wherein the MAC layer name tag comprises at least one of a Multicast Connection IDentifier (MCID), a Multicast and Broadcast Service (MBS) zone ID, and a Logical Channel ID (LCID).

* * * * *